United States Patent Office 3,194,584
Patented July 13, 1965

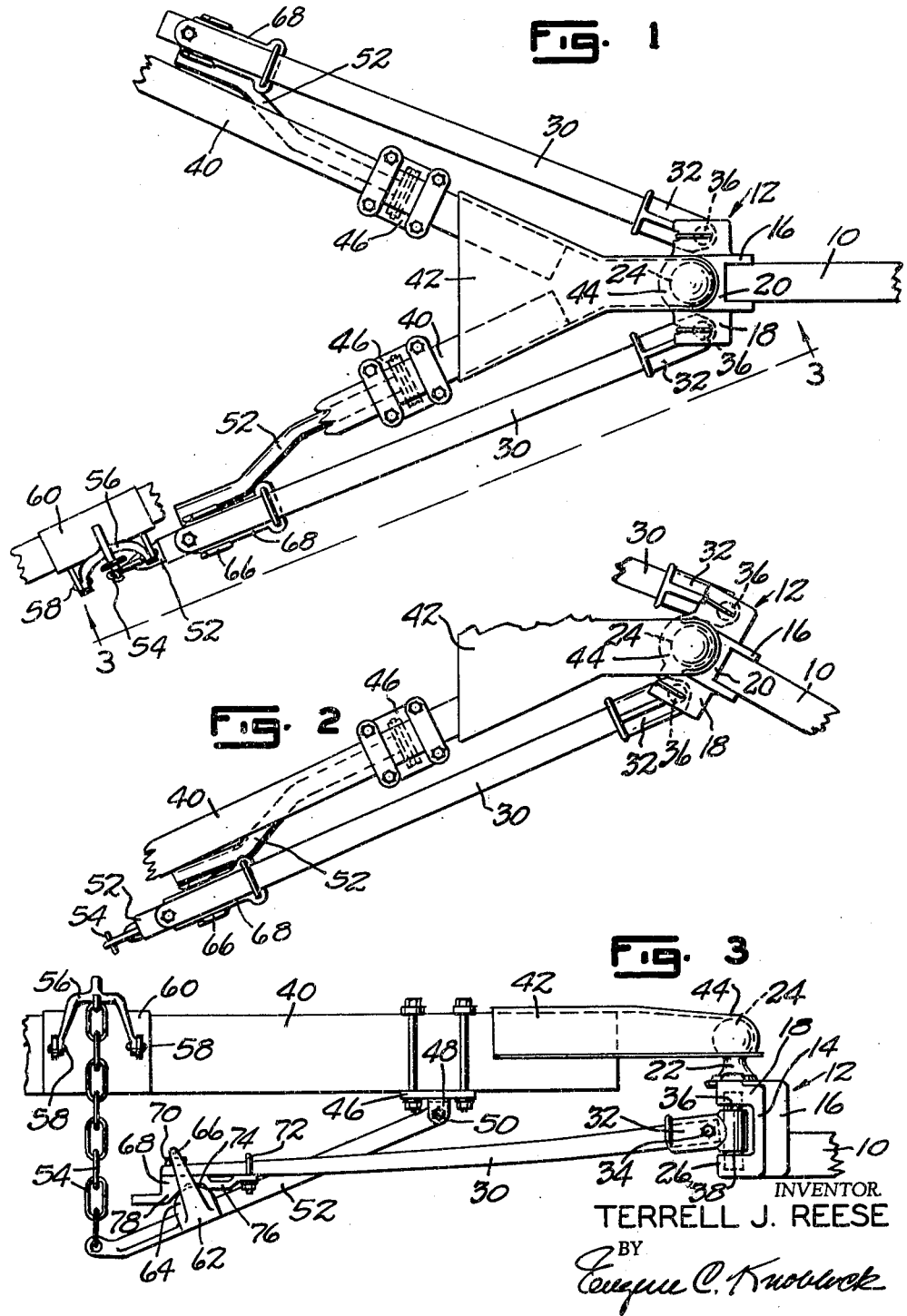

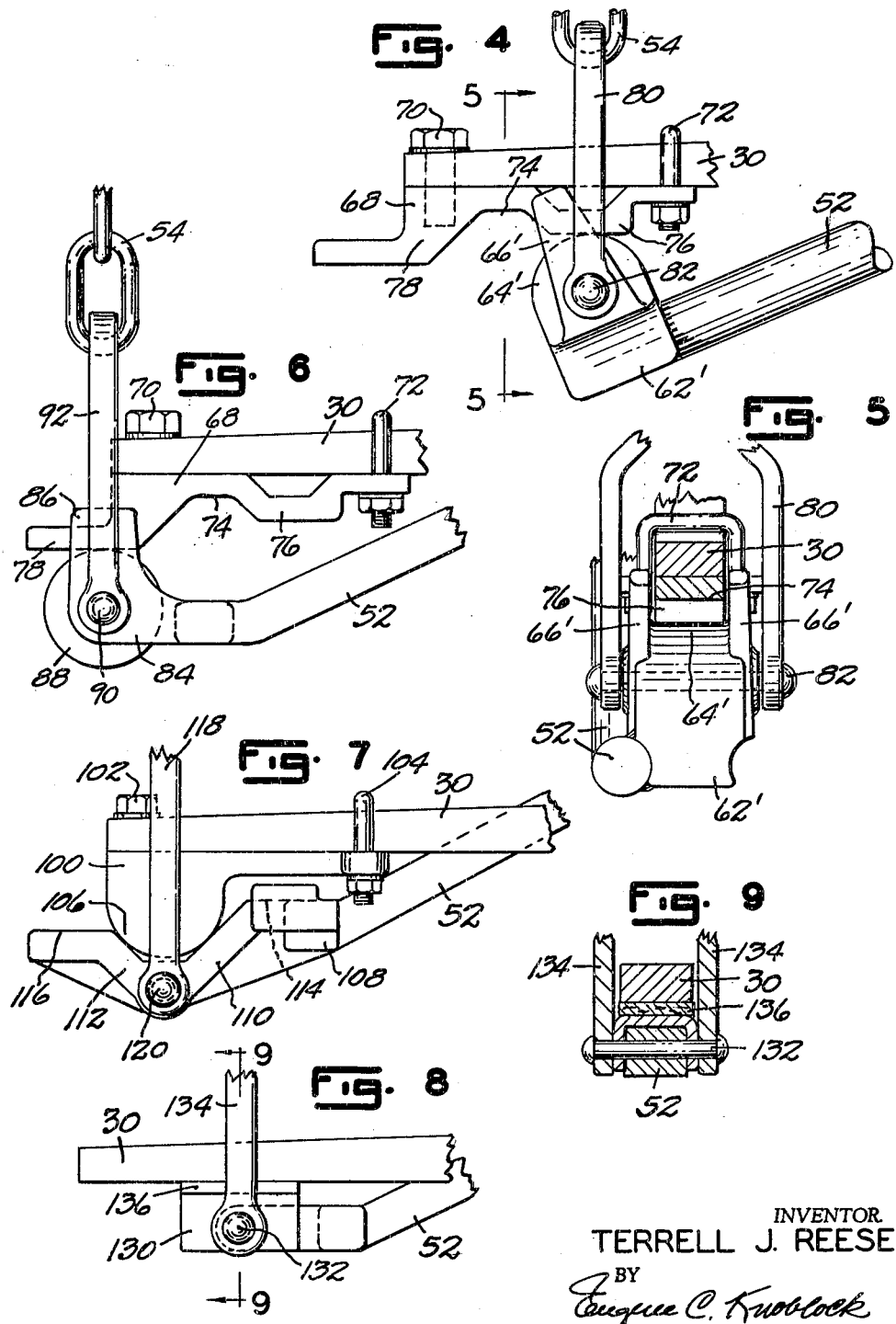

3,194,584
LOAD TRANSFERRING TRAILER HITCH
Terrell J. Reese, 4013 Cassopolis St., Elkhart, Ind.
Filed Aug. 22, 1963, Ser. No. 303,889
13 Claims. (Cl. 280—406)

This invention relates to improvements in load transferring trailer hitches. More particularly it relates to a device functioning to connect a trailer to a tractor and serving to transmit part of the load from the trailer to the front wheels of the tractor and part thereof to the rear wheels of the tractor. This invention is an improvement upon devices covered by my prior Patents 2,729,467, dated January 3, 1956, 2,808,277, dated October 1, 1957, and 2,952,475, dated September 13, 1960.

The towing of a trailer, such as a mobile home or camping trailer, introduces certain problems and hazards for the driver which are not encountered when driving a single automotive unit. The trailer hitch introduces an articulation or joint in the tractor-trailer combination which requires careful driving and creates hazards, such as the possibility of "jackknifing."

The primary object of this invention is to produce a hitch which minimizes the danger of jackknifing and side sway and enables a driver to correct driving conditions causing side sway and tending to produce jackknifing.

A further object is to produce a trailer hitch which permits a driver of a tractor-trailer combination to travel a circuitous course with frequent sharp turns at high rates of speed without danger of loss of control by the driver.

A further object is to provide a device of this character which serves to cause a towed vehicle to track a towing vehicle without introducing any unstabilizing action upon the towing vehicle under all types of driving conditions such as circuitous downhill travel and travel on slippery of icy pavements.

A further object is to provide a device of this character which permits a tractor-trailer combination to be driven at high speed over a rough roadway with full control even under conditions in which one side of the towing and trailing vehicles is traversing ground at a lower level than that traversed by the other side of the vehicle, as in cases where the right wheels of a towing and a trailing vehicle travel upon a berm of a road at a lower level than the road level.

A further object is to provide a hitch which introduces a tendency to tilt a towed vehicle laterally while making a turn, said tilt occurring in a manner to raise the side of the vehicle which is at the outside of the turn.

A further object is to provide a trailer hitch which functions to elevate the leading end of a trailer while a turn is being made.

A further object is to provide a hitch of this character provided with means tending to restore a trailer to aligned position relative to a tractive vehicle after a turn has been made.

A further object is to provide a hitch which produces a stable tractor-trailer combination under adverse driving conditions and in conditions where heavy gusts of wind are experienced and in conditions resulting from passing large trucks or other tractor-trailer combinations traveling at high speed so as to create an air disturbance normally rendering maintenance of control of a tractor-trailer combination difficult.

Other objects will be apparent from the following specification.

In the drawings:

FIG. 1 is a fragmentary top plan view of a hitch utilizing one embodiment of my invention and illustrating the hitch in normal straight line towing relation;

FIG. 2 is a fragmentary top plan view illustrating the position of the hitch parts in making a turn;

FIG. 3 is a view of the hitch in side elevation;

FIG. 4 is an enlarged fragmentary side elevational view of the hitch illustrating a modified construction of the device and illustrating the position of the parts at the side of the trailer in the direction in which a turn is being made;

FIG. 5 is a fragmentary vertical sectional view taken on line 5—5 of FIG. 4;

FIG. 6 is a fragmentary side elevational view of another modified embodiment of the invention illustrating the position assumed by the parts when making a turn, when viewed at the side of the trailer located at the outside of the turn;

FIG. 7 is a fragmentary side elevational view illustrating another modified embodiment of the invention, and illustrating the parts in their normal straight line driving position;

FIG. 8 is a fragmentary side view illustrating another modified embodiment of the invention;

FIG. 9 is a fragmentary vertical transverse sectional view taken on line 9—9 of FIG. 8.

Referring to the drawings, and particularly to FIGS. 1, 2 and 3 which illustrate one embodiment of the invention, the numeral 10 designates an elongated horizontal rigid tube forming part of an elongated carrier which is adapted to be secured at longitudinally spaced points to the frame or chassis of a tractive motor vehicle, such as an automobile or truck. This carrier is secured to the automobile or truck in fixed relation thereto and in such a manner as to transmit stress acting upon the free or outer end of the carrier to the tractor frame at longitudinally spaced points thereof. The carrier part 10 has a hitch ball bracket 12 welded or otherwise fixedly secured to the rear or outer free end thereof. Bracket 12 preferably projects vertically from the carrier 10. The hitch ball bracket 12 may be of the type and construction shown in my Patent No. 2,952,475, dated September 13, 1960, and may include a vertical transverse plate portion 14 reinforced by vertical forwardly projecting spaced symmetrically positioned flanges 16. The bracket 12 includes an integral top wall portion 18 extending rearwardly from the plate 14 and having a central portion 20 adapted to support and securely mount the shank portion 22 of a hitch ball or kingpin 24. The center or axis of the kingpin 24 will preferably intersect the axis of the carrier tube or bar 10. Each of the opposite side portions of the top wall 18 is provided at the bottom face thereof with an elongated longitudinally extending slot open at the rear edge of the wall 18 and terminating at an abutment shoulder preferably spaced rearwardly from the front wall 14. The hitch ball bracket has a pair of integral socket members 26 projecting rearwardly from the wall 14 below the opposite side portion of top wall 18 and in vertically spaced relation therebelow. Each socket portion 26 has a longitudinally elongated groove or recess open at its top and having its longitudinal axis preferably in substantially the same plane as the longitudinal axis of the groove of the grooved portion of the upper wall 18 previously described.

An elongated spring unit of cantilever type is detachably pivotally carried by the hitch ball bracket 12 at each side thereof. This cantilevered spring unit includes an elongated spring steel bar 30 which is normally straight and may be of any desired configuration, such as the longitudinally tapered shape as shown in FIG. 3. Each spring bar 30 is carried by a rigid pivot carrier 32 which preferably includes a socket portion snugly and non-rotatively receiving an end portion of the spring bar 30. The spring bar is fixedly secured in this socket by any suitable securing means 34, such as a locking pin. An upwardly projecting cylindrical pin 36 is formed integrally with the spring carrier 32 and a downwardly projecting cylindrical pin portion 38 is carried by the spring carrier 32 and preferably substantially axially aligned with the pin portion 36. The common axis of the pin portions 36 and 38 is preferably displaced slightly from right angle relation to the axis of the spring 30 and the spring carrier 32. The pins 36 and 38 constitute hinge pins, with the pin 38 fitting in a groove in the upper part 18 of the bracket 12. The pins 36 and 38 are free to rotate relatively to the hitch bracket 12 and will fit removably in the parts of the hitch bracket to facilitate assembly and disconnection of the spring bar relative to the hitch bracket, as desired.

The trailing vehicle (not shown) is usually provided with a tongue portion including forwardly converging frame members 40 which are fixedly interconnected at their front converging ends by a gusset plate or other structure 42. The plate 42 includes a forwardly projecting socket member 44 fitting detachably and pivotally around the hitch ball 24. Each of the trailer tongue portions 40 mounts a bracket 46 adjacent its forward end, said brackets 46 being equally spaced from the hitch ball socket 44. Each bracket 46 has ears 48 depending therefrom to which is pivoted at 50 on a substantially horizontal axis the front end of an elongated rigid lever 52. The rear free end of the lever 52 is suspended by an elongated flexible support carried by the trailer tongue. In the construction shown in FIGS. 1, 2 and 3, the suspension means consists of a chain 54 pivotally connected to the lever 52 at its rear end. The upper part of the chain 54 is suspended at a selected part thereof by means of a bracket 56 having a chain engaging hook and pivoted at 58 to a carrier 60 fixedly secured to the tongue member 40. Any suitable means (not shown) may be utilized for the purpose of holding the bracket 56 in operative elevated position shown in FIG. 3, and is releasable to permit the bracket 56 to swing about the pivots 58 to a lowered position for the purpose of lowering the free end of the lever 52. The lever 52 is preferably bent or offset laterally outwardly at 62 intermediate its ends. The offset portion 62 preferably has a curved upper surface portion or knuckle 64 whose axis is transverse of the length of the lever 52 and which projects above the upper surface of the lever 52. A pair of spaced vertical fingers 66 project upwardly from the offset part 62 at opposite ends of the knuckle 64.

Each elongated spring bar 30 extends rearwardly from the hitch bracket 12 at a level below the trailer tongue parts 40 and preferably laterally outwardly therefrom. The free end of each spring bar 30 mounts a camming bracket 68 which is fixedly secured thereto by any suitable means, such as the cap screw 70 and U-bolt 72. The cam bracket 68 has a configured bottom camming surface characterized by a central seat portion 74 at higher elevation than a forward bracket part 76 and a rearward bracket part 78. The part 78 is preferably lower in elevation than the part 76. Inclined or camming faces extend between the seat or socket part 74 and each of the front and rear bracket parts 76 and 78.

In use, the parts are assembled as illustrated in FIGS. 1 and 3, with the hitch ball 24 and the socket 44 providing a pivotal connection between a tractive vehicle (not shown), to which the carrier 10 is fixedly secured, and the trailing vehicle (not shown) whose tongue portions 40 carry the socket 44. Two spring bars 30 have their pins 36 and 38 pivoted about vertically or substantially vertically positioned axes of the hitch bracket 12. The rear end of each spring bar 30 and its cam bracket 68 bear against the knuckle portion 64 of a lever 52 pivoted to the adjacent trailer tongue part 40 so that its knuckle 64 seats at the socket 74 of the cam bracket 68. Each lever 52 is supported by the suspension means, such as the chain 54 and its supporting bracket 56, at such a position as to flex the spring 30 upwardly. This upward flexing of the spring functions to transmit the weight of the front end of the trailing vehicle through the hitch bracket 12 to the carrier 10 and, in turn, to the frame of the tractive vehicle in a manner to apply part of the weight of the trailer to the front wheels of the tractive vehicle. This load transferring action is substantially similar to that which occurs in my prior Patent No. 2,952,475.

The parts are normally so arranged that when the trailer is aligned with the tractor the knuckle 64 will seat in the seat 74 of the cam bracket 60 of each spring 30. The interfit of the knuckle 64 and the spring seat 74 serves to stabilize the tractor-trailer combination and to cause straight line travel thereof.

When the tractor vehicle turns, the hitch bracket 12 turns with it relatively to the trailer tongue and the hitch ball socket 44, as illustrated in FIG. 2. This action causes the spring bar 30 at the inside of the turn, as illustrated in FIG. 2, to be moved rearwardly relative to the adjacent trailer tongue member 40 while the other hitch bar 30 located at the outside of the turn is pulled forwardly relative to the trailer tongue member 40 adjacent thereto. When this action occurs, the cam bracket 68 at the end of each spring 30 shifts relative to the knuckle 64 of the lever 52 on which it bears. Thus the cam bracket on the spring 30 at the inside of the turn moves rearwardly so that the front bracket part 76 slides onto the knuckle 64 while the cam bracket of the spring at the outside of the turn moves forwardly so that its rear part 78 moves onto the knuckle 64. Thus it will be seen that both spring bars must flex to accommodate this action with the greater flexure occurring at the spring bar at the outside of the turn. This tends simultaneously to elevate the trailer tongue slightly and also to tilt the trailer tongue laterally in the direction of the turn. This action is compared to that experienced in the travel of a vehicle around a banked turn and greatly increases the stability of the tractor-trailer combination during the turn. High speed turns are possible by reason of this relation of the parts.

As soon as the turn is completed and the tractive vehicle has straightened in its direction of travel, the trailer tends to follow it in a straight path. This is facilitated by the cam surfaces between the seat portion 74 of the cam bracket 68 and both the front bracket part 76 and the rear bracket part 78. Under normal conditions the movement of the spring arms 30 relative to the knuckles 64 incident to making a turn will be comparatively limited so that the knuckle 64 will remain in contact with at least one of the cam surfaces while the turn is being made. Thus the engagement of this knuckle and cam surface, together with the increased flexure of the spring 30, tends to apply a force to restore the parts to their normal positions with the knuckles 64 fitting in the seat 74. By reason of this arrangement it has been found that, if a tractive vehicle traveling at substantial speed as it finishes a turn is freed of driver control upon the steering wheel, the tractor-trailer combination will act automatically to restore itself to straight line travel. This element is of considerable importance and serves as a stabilizing factor to prevent side sway of the character which normally leads to or causes jackknifing. This characteristic also serves to maintain the trailing travel of the trailer relative to the tractor under adverse driving conditions, such as downhill driving, on a slippery pavement, travel with the wheels at one side of the tractor and trailer on a low level road berm, travel on icy pavement, and the like. Thus the device makes possible driving of a tractor-trailer combination by inexperienced drivers with safety under adverse driving conditions. It also makes possible traveling of circuitous routes with safety and permits conditions, which have heretofore been regarded as extremely hazardous, to be met with ease and without requiring extreme care or caution. One of such conditions is the circuitous travel of a tractor-trailer combination down-hill without risk of side-sway which ordinarily would occur and tend to produce jackknifing. Another condition which this device meets successfully is wind gusts produced either by nature or by passing large vehicles traveling at high speed. No difficulty in maintaining control of the tractor-trailer combination under such gusty conditions is experienced with this hitch construction.

A modified embodiment of the invention is illustrated in FIGS. 4 and 5 wherein parts similar to those referred to in FIGS. 1 to 3 bear the same reference numerals. In this construction the offset part 62' is welded or otherwise fixedly secured at the rear end of each lever 52 and has the upwardly projecting knuckle portion 64' and upwardly projecting arms 66' at opposite ends of the knuckle part 64'. A clevis 80 is pivotally connected at 82 to the knuckle 64' substantially concentric therewith and fits freely around the spring 30 and the cam bracket 68 carried thereby. The clevis provides means for connection of the suspending member such as the chain 54. This arrangement functions similarly to that shown in FIGS. 1 to 3 and has the advantage of a reduction of the overall length of each of the levers 52 and resultant greater road clearance of the lower free ends of the levers 52 without sacrifice of the functioning of the device. The manner in which the front cam part 76 rides upon the knuckle 64' during a turn when considering the spring at the inside of the turn is illustrated in FIG. 4.

Another modified embodiment is illustrated in FIG. 6. In this construction the rear end of each lever 52 is bifurcated at 84 and the fork parts include vertical projections 86. A roller 88 is journaled between the forks 84 about a pivot axis 90 in such position that the uppermost surface of the roller 88 terminates below the top edges of the fork parts 86. A clevis 92 is pivoted at 90 and is supported by a suspension member, such as chain 54 as previously described. This construction operates with the cam bracket 68 on the spring arm 30 in the same manner described above. The principal difference in functioning between this embodiment and those previously described is that the frictional resistance of the parts to turning of the tractor-trailer combination is reduced.

Another embodiment of the invention is illustrated in FIG. 7. This embodiment entails a reversal of parts with respect to the construction illustrated in FIGS. 4 and 5. Thus it will be observed that the end of the spring arm 30 has fixedly secured thereto at its bottom surface a bracket member 100 anchored by suitable means, such as a cap screw 102 and a U-bolt 104. The bracket 100 is characterized by a downwardly projecting knuckle portion 106.

The pivot lever 52 has an offset portion 108 from which projects a V-shaped part having a front inclined part 110 and a rear inclined part 112 which cooperate to define therebetween a seat portion which normally receives the knuckle 106. A front platform portion 114 normally substantially horizontal and a rear platform portion 116 complete the configuration of the V-shaped part. It will be observed that the V-part 110 is longer than the V-part 112 so that the platform 114 is at a higher elevation than the platform 116. A suspension clevis 118 is pivoted at 120 preferably between the V-parts 110 and 112 and is in turn carried by flexible suspension means, such as the chain 54 previously described.

In this embodiment of the invention the same action described previously occurs upon turning of the tractive vehicle relative to the trailing vehicle, so as to bodily lengthwise shift the springs 30 relative to their cooperating supporting levers 52. As this longitudinal movement of each of the springs 30 relative to its supporting parts occurs, the knuckle traverses one or the other of the inclined cam parts 110 and 112 and causes flexing of the spring 30 in a manner to impart resistance to the vehicle turning action and to provide stability to the tractor-trailer combination and to tend to return the tractor-trailer combination to alignment.

It will be observed that the unequal lengths of the V-parts 110 and 112 are reversed in the FIG. 7 construction compared to that in FIG. 4 as required by the transposition of parts. Thus the spring at the outside of a turn which is pulled forwardly, as illustrated in FIG. 2, has its cam knuckle 106 traversing the long cam incline 110 to introduce a greater lateral tilt action upon the trailer than occurs at the spring bar located at the inside of the turn which has its knuckle 106 traversing the comparatively shallow cam member 116 and then traversing the platform part 116.

The cam configuration shown utilizes cam angles of approximately 45 degrees. It will be understood that such cam angles are preferred but are not required. Thus less abrupt cam surfaces may be provided if desired. Also it will be understood that the use of knuckle members having a rounded contour, as here illustrated at 64, 64' and 106, are not essential, and that instead, the knuckle member may have a contour or configuration substantially complementary to the camming surfaces which it engages, so as to provide a large area of contact between the cam faces on the respective parts as means to minimize wear of the parts.

Another embodiment of the invention is illustrated in FIGS. 8 and 9, wherein the camming feature described in the preceding embodiments is eliminated. In this construction the lever 52 has a substantially horizontal end portion 130 which normally extends substantially parallel to the bottom surface of the adjacent bar spring 30 when the latter has been flexed in the normal operating position required to transmit a part of the stress or weight of the carrier to the carrier member 10 mounted by the tractive vehicle, so as to apply a part of the trailer stress to front steering wheels of the vehicle. The rear free lever carries a part 130 which may be of channel shape in cross-section, as illustrated in FIG. 9, and has pivoted thereto at 132 arms of a clevis 134 which is connected with the suspension means carried by the trailer frame, such as the chain 54. One of the cooperating parts 130 and 30 has fixedly secured thereto a friction sustaining material 136 comparable to automotive brake lining.

In the operation of this device, endwise movement of the spring bars 30 incident to a turn of the tractor-trailer combination relative to the supporting end portion 130 of the lever 52 is accommodated but is retarded by the frictional pad 136 which usually is carried by the member 130 so that the full area thereof is effective for frictional retarding purposes regardless of the extent of endwise movement of the bar spring 30. This construction lacks the self-straightening or self-aligning characteristic of the previously described embodiments of the invention, and also the variable tilt regulating properties of the preceding embodiments. However, this embodiment of the invention does have the property of retarding side sway of the trailing vehicle incident to circuitous travel and has the advantage of damping any tendency of the tractor-trailer combination toward a periodic side sway or to a jackknifing action. This construction also provides stability for travel down hill at slow speeds and under conditions in which the trailer tends normally to overtake the tractive vehicle due to its momentum and thus tends to introduce unstable driving conditions and to introduce or amplify any tendency to a side sway.

While the preferred embodiments of the invention have been illustrated and described, it will be understood that changes in the construction may be made within the scope of the appended claims without departing from the spirit of the invention.

I claim:
1. A load-transferring trailer hitch for connecting tractive and trailing vehicles comprising
    a rigid unit adapted to be secured to the frame of a tractive vehicle and including a hitch ball bracket having a central hitch ball,
    a hitch ball socket carried by the frame of said trailing vehicle, a pair of elongated spring bars pivoted at one end thereof about substantially vertical axes to said bracket in laterally spaced relation to said hitch ball, means adapted to be carried by the frame of said trailing vehicle for supporting the free ends of said spring bars in upwardly flexed position, and means for simultaneously retarding endwise movement of and varying the flexure of said spring bars relative to said supporting means incident to turning of said tractive vehicle.

2. A device for transferring a part of the load of a trailing vehicle to a tractive vehicle to which it is pivotally connected, comprising a rigid unit adapted to be secured to the frame of a tractive vehicle and including a rigid bracket, a pair of elongated spring bars pivoted at one end thereof about substantially vertical axes to said bracket in laterally spaced relation to the pivot connection of said vehicles, means adapted to be carried by the frame of a trailing vehicle in laterally and rearwardly spaced relation to said bracket and supporting the free ends of said spring bars in upwardly flexed position, and means for varying the flexure of said spring bars upon endwise movement thereof relative to said supporting means.

3. A device for transferring a part of the load of a trailing vehicle to a tractive vehicle to which it is pivotally connected, comprising a rigid unit adapted to be secured to the frame of a tractive vehicle and including a rigid bracket, a pair of elongated spring bars pivoted at one end thereof about substantially vertical axes to said bracket in laterally spaced relation to the pivot connection of said vehicles, means adapted to be carried by the frame of a trailing vehicle in laterally and rearwardly spaced relation to said bracket and supporting the free ends of said spring bars in upwardly flexed position, means for resisting endwise movement of said spring bars relative to said supporting means, said spring bar supporting means including a pair of levers pivoted on substantially horizontal axes to the frame of the trailing vehicle and each having a part supporting the free end part of a spring bar, and means carried by the trailing vehicle for suspending the free end of each lever.

4. A device for transferring a part of the load of a trailing vehicle to a tractive vehicle to which it is pivotally connected, comprising a rigid unit adapted to be secured to the frame of a tractive vehicle and including a rigid bracket, a pair of elongated spring bars pivoted at one end thereof about substantially vertical axes to said bracket in laterally spaced relation to the pivot connection of said vehicles, means adapted to be carried by the frame of a trailing vehicle in laterally and rearwardly spaced relation to said bracket and supporting the free ends of said spring bars in upwardly flexed position, means for resisting endwise movement of said spring bars relative to said supporting means, said spring bar supporting means including a pair of levers pivoted on substantially horizontal axes to the frame of the trailing vehicle and each having a part supporting the free end part of a spring bar, and releasable suspension means carried by said trailing vehicle for supporting the free end of each lever.

5. A device for transferring a part of the load of a trailing vehicle to a tractive vehicle to which it is pivotally connected, comprising a rigid unit adapted to be secured to the frame of a tractive vehicle and including a rigid bracket, a pair of elongated spring bars pivoted at one end thereof about substantially vertical axes to said bracket in laterally spaced relation to the pivot connection of said vehicles, means adapted to be carried by the frame of a trailing vehicle in laterally and rearwardly spaced relation to said bracket and supporting the free ends of said spring bars in upwardly flexed position, and means for resisting endwise movement of said spring bars relative to said supporting means, said last named means including cams spaced fore and aft of the normal position of supporting interengagement of each spring bar with its supporting means.

6. A device for transferring a part of the load of a trailing vehicle to a tractive vehicle to which it is pivotally connected, comprising a rigid unit adapted to be secured to the frame of a tractive vehicle and including a rigid bracket, a pair of elongated spring bars pivoted at one end thereof about substantially vertical axis to said bracket in laterally spaced relation to the pivot connection of said vehicles, means adapted to be carried by the frame of a trailing vehicle in laterally and rearwardly spaced relation to said bracket and supporting the free ends of said spring bars in upwardly flexed position, and means for resisting endwise movement of said spring bars relative to said supporting means, one part of each interengaging pair of spring bar and support means carrying a knuckle and the other part of said pair carrying a pair of cams positioned fore and aft of said knuckle and engageable therewith.

7. A device for transferring a part of the load of a trailing vehicle to a tractive vehicle to which it is pivotally connected, comprising a rigid unit adapted to be secured to the frame of a tractive vehicle and including a rigid bracket, a pair of elongated spring bars pivoted at one end thereof about substantially vertical axes to said bracket in laterally spaced relation to the pivot connection of said vehicles, means adapted to be carried by the frame of a trailing vehicle in laterally and rearwardly spaced relation to said bracket and supporting the free ends of said spring bars in upwardly flexed position, and means for resisting endwise movement of said spring bars relative to said supporting means, one part of each interengaging pair of spring bar and supporting means carrying a pair of longitudinally spaced cams and the other part of said pair carrying a rotatable cam-engaging member normally positioned between said cams.

8. A device for transferring a part of the load of a trailing vehicle to a tractive vehicle to which it is pivotally connected, comprising a rigid unit adapted to be secured to the frame of a tractive vehicle and including a rigid bracket, a pair of elongated spring bars pivoted at one end thereof about substantially vertical axes to said bracket in laterally spaced relation to the pivot connection of said vehicles, means adapted to be carried by the frame of a trailing vehicle in laterally and rearwardly spaced relation to said bracket and supporting the free ends of said spring bars in upwardly flexed position, and means for resisting endwise movement of said spring bars relative to said supporting means, one part of each interengaging pair of spring bar and support means carrying a pair of longitudinally spaced cams of different dimensions, and the other part of said pair having a cam-engaging projection normally seating between said cams.

9. A device for transferring a part of the load of a trailing vehicle to a tractive vehicle to which it is pivotally connected, comprising a rigid unit adapted to be secured to the frame of a tractive vehicle and including a rigid bracket, a pair of elongated spring bars pivoted at one end thereof about substantially vertical axes to said bracket in laterally spaced relation to the pivot connection of said vehicles, means adapted to be carried by the frame of a trailing vehicle in laterally and rearwardly spaced relation to said bracket and supporting the free ends of said spring bars in upwardly flexed position, and means for resisting endwise movement of said spring bars relative to said supporting means, one part of each interengaging pair of spring bars and support means having a substantially V-shaped recess confronting the other part and said other part of each pair having a part normally seating in said recess.

10. A device for transferring a part of the load of a trailing vehicle to a tractive vehicle to which it is pivotally connected, comprising a rigid unit adapted to be secured to the frame of a tractive vehicle and including a rigid bracket, a pair of elongated spring bars pivoted at one end thereof about substantially vertical axes to said bracket in laterally spaced relation to the pivot connection of said vehicle, means adapted to be carried by the frame of a trailing vehicle in laterally and rearwardly spaced relation to said bracket and supporting the free ends of said spring bars in upwardly flexed position, and means for resisting endwise movement of said spring bars relative to said supporting means, one part of each interengaging pair of spring bar and support means having a pair of longitudinally spaced cams of different elevations and the other part of each pair having a cam-engaging part normally seating between said cams, the cam of greatest elevation being positioned to be traversed by said cam-engaging part when the associated pair of parts is located at the outside of a turn of said vehicles whereby said trailing vehicle is tilted laterally by said cam in the direction of said turn.

11. A load transferring trailer hitch for connecting tractive and trailing vehicles, comprising a rigid unit adapted to be secured to the frame of a tractive vehicle and including a hitch ball bracket having a central hitch ball, a hitch ball socket carried by the frame of said trailing vehicle, a pair of elongated spring bars pivoted at one end thereof about substantially vertical axes to said bracket in laterally spaced relation to said hitch ball, means adapted to be carried by the frame of said trailing vehicle for supporting the free ends of said spring bars in upwardly flexed position, and interengaging socket and projection parts on the parts of each pair of interengaging spring bar and support means cooperating to resist endwise movement of said spring bar from a normal centered position of said socket and projection upon turning of said tractive vehicle and to restore said parts to said centered position following such a turn.

12. A device for transferring a part of the load of a trailing vehicle to a tractive vehicle to which it is pivotally connected, comprising a rigid unit adapted to be secured to the frame of a tractive vehicle and including a rigid bracket, a pair of elongated spring bars pivoted at one end thereof about substantially vertical axes to said bracket in laterally spaced relation to the pivot connection of said vehicles, means adapted to be carried by the frame of a trailing vehicle in laterally and rearwardly spaced relation to said bracket and supporting the free ends of said spring bars in upwardly flexed position, means for varying the flexure of said spring bars upon endwise movement thereof relative to said supporting means, and guide means for limiting relative movement of said spring bar and support means in a direction transverse of said spring bar.

13. A device for transferring a part of the load of a trailing vehicle to a tractive vehicle to which it is pivotally connected, comprising a rigid unit adapted to be secured to the frame of a tractive vehicle and including a rigid bracket, a pair of elongated spring bars pivoted at one end thereof about substantially vertical axes to said bracket in laterally spaced relation to the pivot connection of said vehicles, means adapted to be carried by the frame of a trailing vehicle in laterally and rearwardly spaced relation to said bracket and supporting the free ends of said spring bars in upwardly flexed position, and means for resisting endwise movement of said spring bars relative to said supporting means, said supporting means including a pair of levers adapted to be pivoted on substantially horizontal axes to said trailer in rearwardly spaced relation to said bracket and each having a part supporting the free end of one of said spring bars, a clevis pivoted to the free end of each lever and passing around the supported spring bar with clearance, and trailer-carried means for suspending said clevis.

References Cited by the Examiner

UNITED STATES PATENTS

| | | | |
|---|---|---|---|
| 2,808,272 | 10/57 | Reese | 280—406 |
| 2,898,124 | 8/59 | Bernard et al. | 280—406 |
| 2,940,776 | 6/60 | Curtis | 280—406 |
| 2,952,475 | 9/60 | Reese | 280—406 |

BENJAMIN HERSH, *Primary Examiner.*

LEO FRIAGLIA, *Examiner.*